(12) United States Patent
Minowa et al.

(10) Patent No.: US 8,779,063 B2
(45) Date of Patent: Jul. 15, 2014

(54) CROSS-LINKED POLYOLEFIN COMPOSITION

(75) Inventors: Kazuhiko Minowa, Kawasaki (JP); Yukihiro Hisanaga, Kawasaki (JP); Paolo Goberti, Ferrara (IT); Giampaolo Pellegatti, Boara (IT)

(73) Assignee: Basell Poliolefine Italia S.r.l., Milan (IT)

(*) Notice: Subject to any disclaimer, the term of this patent is extended or adjusted under 35 U.S.C. 154(b) by 0 days.

(21) Appl. No.: 13/806,710

(22) PCT Filed: Jun. 23, 2011

(86) PCT No.: PCT/EP2011/060564
§ 371 (c)(1),
(2), (4) Date: Dec. 21, 2012

(87) PCT Pub. No.: WO2012/000885
PCT Pub. Date: Jan. 5, 2012

(65) Prior Publication Data
US 2013/0096261 A1    Apr. 18, 2013

Related U.S. Application Data

(60) Provisional application No. 61/401,037, filed on Aug. 6, 2010.

(30) Foreign Application Priority Data

Jun. 30, 2010 (EP) ..................................... 10167871

(51) Int. Cl.
*C08F 8/00* (2006.01)
*C08L 23/00* (2006.01)

(52) U.S. Cl.
USPC ......................................... 525/191; 525/240

(58) Field of Classification Search
USPC ................................................ 525/191, 240
See application file for complete search history.

(56) References Cited

U.S. PATENT DOCUMENTS

| | | |
|---|---|---|
| 5,143,978 A | 9/1992 | Berta |
| 5,552,482 A | 9/1996 | Berta |
| 7,592,393 B2 * | 9/2009 | Pelliconi et al. ............. 525/191 |

FOREIGN PATENT DOCUMENTS

| | | |
|---|---|---|
| EP | 0633289 | 1/1995 |
| EP | 1279699 | 1/2003 |
| WO | WO-98/37144 | 8/1998 |
| WO | WO-2006/042815 | 4/2006 |
| WO | WO-2007042375 | 4/2007 |
| WO | WO-2009/000637 | 12/2008 |
| WO | WO-2010034684 | 4/2010 |
| WO | WO-2012000884 | 1/2012 |

OTHER PUBLICATIONS

Chujo, R et al., "Two-site model analysis of 13C n.m.r. of polypropylene polmerized by . . . ", Polymer, vol. 35, No. 2 1994, 339.
Asakura, et al., "Carbon-13 NMR Spectral Assignment . . . ", Macromolecules 1991, 24 1991, 2334-2340.
Randall, J., "A Review of High Resolution Liquid (13) Carbon Nuclear Magnetic Resonance Characterizations of Ethylene-Based Polymers", JMS-Rev. Macromol. Chem. Phys. C29 (2&3) 1989, 201-317.
Cheng, H. N. et al., "13C NMR Analysis of Propylene-Butylene Copolymers by a Reaction Probability Model", Journal of Polymer Science, vol. 21. 1983, 573-581.
Kakugo, Masahiro et al., "C NMR Determination of Monomer Sequence Distribution in Ethylene-Propylene copolymers prepared . . . ", Macromolecules, vol. 15, No. 4, 1982, 1150-1152.
Carman, C.J. et al., Macromolecules, 10, 3, 536 1977.

* cited by examiner

*Primary Examiner* — Nathan M Nutter

(57) ABSTRACT

A cross-linked composition, obtained by cross-linking polyolefin composition comprising, all percentages being by weight:
A) from 5 to 38% of a polypropylene component;
B) from 35 to 85% of a copolymer of ethylene with propylene, containing from 42 to 70% of ethylene and having solubility in xylene at room temperature greater than 50%;
C) from 5 to 45% of a polymer composition comprising a blend of:
  i) from 20 to 80% of an ethylene copolymer having a Shore A hardness value equal to or lower than 90 points and containing up to 45% of at least one α-olefin comonomer, provided that, when propylene is present as comonomer, such copolymer i) has a composition which is different from B);
  ii) from 20 to 80% of a propylene copolymer having a Shore A hardness value equal to or lower than 90 points and containing up to 40% of at least one α-olefin comonomer;
wherein the amounts of A), B) and C) are referred to the total weight of A)+B)+C) and the amounts of i) and ii) are referred to the weight of C).

8 Claims, No Drawings

CROSS-LINKED POLYOLEFIN COMPOSITION

CROSSED-LINKED POLYOLEFIN COMPOSITION

This application is the U.S. national phase of International Application PCT/EP2011/060564, filed Jun. 23, 2011, claiming priority to European Patent Application 10167871.2 filed Jun. 30, 2010, and the benefit under 35 U.S.C. 119(e) of U.S. Provisional Application No. 61/401,037, filed Aug. 6, 2010; the disclosures of International Application PCT/EP2011/060564, European Patent Application 10167871.2 and U.S. Provisional Application No. 61/401,037, each as filed, are incorporated herein by reference.

The present invention relates to a cross-linked thermoplastic and elastomeric polyolefin composition having low hardness and reduced compression set and to the process for its preparation.

By virtue of its low hardness and very good rheological properties, said composition is especially useful for applications wherein softness and capability to be easily formed even into articles of reduced thickness is desired, like for the production of wire and cable sheaths, auto interior skins, synthetic leather and extruded profiles.

Some cross-linked polyolefin compositions of the soft type are already described in U.S. Pat. No. 5,143,978.

These compositions are obtained by cross-linking, in the presence of free radical initiators like organic peroxides, compositions containing a propylene homopolymer or copolymer, an elastomeric olefin copolymer and a crystalline, highly isotactic polymer of butene-1.

However the hardness of said known compositions is still too high, namely around 88-89 Shore A points.

Moreover, paraffin oil is used to improve the rheological properties of the compositions. One problem presented by such known technical solution is that the so obtained compositions are somewhat tacky, due to surface migration of the paraffin oil, and said tackiness reveals itself in time.

It has now surprisingly been found that it is possible to obtain polyolefin compositions having low hardness and very good rheological properties, even in the absence of plasticizers like paraffin oils, by cross-linking a composition containing a specific butene-1 (co)polymer.

Thus, the present invention provides a cross-linked composition obtained by cross-linking a polyolefin composition (I) comprising, all percentages being by weight:
  A) from 5 to 38%, preferably from 8 to 30%, of a polypropylene component comprising a propylene homopolymer or a propylene copolymer with at least one α-olefin comonomer (different from propylene) or combinations thereof, said polypropylene component containing at least 85%, preferably at least 95%, of propylene and having a solubility in xylene at room temperature lower than 20%;
  B) from 35 to 85%, preferably from 40 to 82%, of a copolymer of ethylene with propylene, containing from 42 to 70%, preferably 45 to 70%, more preferably from 50 to 65% of ethylene and having solubility in xylene at room temperature greater than 50%, preferably greater than 60%;
  C) from 5 to 45%, preferably from 5 to 40%, more preferably from 5 to 35%, of a polymer composition comprising a blend of:
    i) from 20 to 80%, preferably from 30 to 70%, more preferably from 40 to 60%, of an ethylene copolymer having a Shore A hardness value equal to or lower than 90 points and containing up to 45%, in particular from 10 to 42%, of at least one α-olefin comonomer (different from ethylene), preferably a $C_4$-$C_{10}$ α-olefin, or a combination thereof, provided that, when propylene is present as comonomer, such copolymer
    i) has a composition (in terms of monomer amounts) which is different from B);
    ii) from 20 to 80%, preferably from 30 to 70%, more preferably from 40 to 60% of a propylene copolymer having a Shore A hardness value equal to or lower than 90 points and containing up to 40%, preferably from 10 to 40% in particular from 20 to 40%, of at least one α-olefin comonomer (different from propylene), preferably ethylene or a $C_4$-$C_{10}$ α-olefin, or a combination thereof;
  wherein the amounts of A), B) and C) are referred to the total weight of A)+B)+C) and the amounts of i) and ii) are referred to the weight of C).

Due to their highly favorable rheological properties, such compositions can be easily processed in the molten state, without requiring any processing aid.

The term "copolymer" as used herein refers to both polymers with two different recurring units and polymers with more than two different recurring units in the chain, such as terpolymers.

The polypropylene component (A) of the polyolefin composition (I) is typically (A1) a propylene homopolymer or (A2) a copolymer of propylene with at least one α-olefin of formula $H_2C=CHR$, where R is H or a $C_{2-6}$ linear or branched alkyl.

Moreover, such component (A) is typically crystalline.

By "crystalline" is meant herein a polymer having high cristallinity, and consequently having a solubility in xylene at room temperature of lower than 20% by weight.

The homopolymer (A1) has a preferred solubility in xylene at room temperature lower than 10% by weight, more preferably lower than 5%, and even more preferably lower than 3%. By "room temperature" is meant herein a temperature of about 25° C.

The copolymer of propylene (A2) has a preferred solubility in xylene at room temperature lower than 15% by weight, more preferably lower than 10%, and even more preferably lower than 8%. Said α-olefin is preferably ethylene, butene-1, pentene-1, 4-methylpentene, hexene-1, octene-1 or any combinations thereof, and even more preferably the copolymer of propylene (A2) is a copolymer of propylene and ethylene.

Preferably, the polypropylene component (A) has a MFR (Melt Flow Rate) value from 5 to 70 g/10 min.

The copolymer (B) preferably has a value of intrinsic viscosity [η] of the fraction soluble in xylene at room temperature from 3.5 to 7 dl/g.

The polypropylene component (A) and the copolymer (B) of the polyolefin composition (I) can be prepared by separate polymerization processes or by sequential polymerisation in at least two stages. According to a preferred embodiment, a sequential polymerisation is carried out in the presence of a catalyst system comprising a trialkylaluminum compound, optionally an electron donor, and a solid catalyst component comprising a halide or halogen-alcoholate of Ti and an electron-donor compound supported on anhydrous magnesium chloride, as described for example in WO2007042375.

The copolymers i) and ii) constituting component C) are typically elastomeric or plastomeric copolymers.

Examples of $C_4$-$C_{10}$ α-olefins that may be present as comonomers in copolymers i) and ii) are those of formula $H_2C=CHR$, where R is a $C_{2-8}$ linear or branched alkyl. Specific examples are butene-1, pentene-1, hexene-1, 4-methylpentene and octene-1. Buene-1 and octene-1 are preferred for copolymer i), while ethylene and butene-1 are preferred for copolymer ii).

The said copolymers i) and ii) have typically a density from 0.850 to 0.890 g/cm$^3$, in particular from 0.855 to 0.885 g/cm$^3$.

Moreover, the said copolymers i) and ii) have typically Shore A hardness values equal to or lower than 80 points, preferably equal to or lower than 70 points.

A specific example of copolymers i) is Tafmer A-10505®, made available on the market by Mitsui Chemicals.

Other suitable copolymers i) are the plastomers Exxact® and Engage®, made available on the market by ExxonMobil Chemical and Dow Chemical.

A specific example of copolymers ii) is Tafmer S4030®, made available on the market by Mitsui Chemicals.

Other suitable copolymers ii) are the plastomers Vistamaxx® and Versify®, made available on the market by ExxonMobil Chemical and Dow Chemical.

The polyolefin composition (I) can be prepared according to conventional methods in known apparatuses, for example blending components A), B) and C) or concentrates thereof in a Henschel or a Banbury mixer or in an extruder, in particular a twin-screw extruder, to uniformly disperse the said components, at a temperature equal to or higher than the polymer melt or softening temperature, followed by pelletizing.

An example of concentrate is the product of the previously explained sequential polymerization, comprising components A) and B).

Conventional additives, fillers and pigments, commonly used in olefin polymers, may be added, such as nucleating agents, extension oils, mineral fillers, and organic and inorganic pigments.

The cross-linked composition of the present invention is obtainable by blending the polyolefin composition (I) with a cross-linking additive and heating the thus obtained blend at a temperature above the melting temperature of component A), preferably at a temperature from 160 to 250° C.

The polyolefin composition (I) can also be prepared in the same apparatus used to carry out the cross-linking step, without going through pelletizing before cross-linking.

In fact the cross-linked polyolefin composition of the present invention is typically prepared by dynamic cross-linking. Said dynamic cross-linking consists of subjecting the above described polyolefin composition (I) to a blending process at a temperature higher than or equal to the polymer softening or melting point, in the presence of a cross-linking additive, which can be added before, during or after the first blending step, continuing said blending during the cross-linking step. Thus the whole process of preparing the polyolefin composition (I) and cross-linking it can be carried out in a single mixing apparatus, in particular in an extruder.

As previously said, it is typically operated at a temperature above the melting temperature of component (A), preferably at a temperature from 160 to 250° C.

Generally, any cross-linking additive known in the art can be used for the preparation of the cross-linked polyolefin composition of the present invention. In particular one can use cross-linking additives comprising organic peroxides, preferably having a half-life in the ethylene-propylene-diene rubbers (EPDM) ranging from 3.3 to 20 minutes, more preferably from 7 to 18 minutes at 160° C.

Specific examples of peroxides are: 1,1'-bis(tert-butylperoxy)diisopropylbenzene; dicumyl peroxide; n-butyl-4,4'-bis(tert-butylperoxy)valerate; 2,5 -di(tert-butylperoxy)2,5-dimethylhexane, 2,5-dimetyl-2,5-di(t-butylperoxy)hexane. The peroxides are generally used in quantities ranging from 0.5 to 5, preferably from 1 to 3 parts by weight per 100 parts by weight of the polyolefin composition (I).

One or more cross-linking co-agents are generally used. Preferred examples of cross-linking co-agents are divinylbenzene, ethylvinylbenzene, triallyl cyanurate, tryallyl isocyanurate, 1,2-polybutadiene, acrylates, methacrylates and furan derivatives.

Specific examples of furan derivatives are 1,5-difurfuryl-1,4-pentadiene-3-one; beta (alpha-furyl)acrolein; 5-(alpha-furyl)pentadienal; alpha-furylacrylamide; alpha-furylacrylonitrile; beta-(alpha-furyl)acrylic acid and its esters; furfurylidene esters. Moreover, the cross-linking additive can contain further cross-linking co-agents, such as phenylene-bis-maleimide and/or sulfur donors, such as mercaptobenzothiazole, benzothiazyl disulfide, tetramethylthiuram monosulfide, tetramethylthiuram disulfide, dipentamethylenethiuram hexasulfide, N,N'-diethylthiourea, amylphenol disulfide, zinc dibutyldithiocarbamate. The cross-linking co-agents are added in quantities generally ranging from 0.5 to 5 parts by weight per 100 parts by weight of the polyolefin composition (I).

The particulars are given in the following examples, which are given to illustrate, without limiting, the present invention.

The following standard procedures are used for testing the properties defined in the examples and in the general description.

Comonomer contents: determined by IR spectroscopy.
MFR: ISO 1133 with a load of 2.16 kg at 230° C.;
Intrinsic viscosity: determined in tetrahydronaphthalene at 135° C. (ASTM D 2857);
Density: ISO 1183;
Compression set at 75° C.: ASTM D 395 method B;
Hardness (Shore A): ISO 868;
Strand surface quality: the surface quality is considered visually as existence of melt fracture on strand surface. Strand surface quality "good" and "excellent" indicate that no melt fracture is evident and the strand surface is smooth or very smooth.
Fractions soluble and insoluble in xylene at 25° C. (XS 25° C.): 2.5 g of polymer are dissolved in 250 mL of xylene at 135° C. under agitation. After 20 minutes the solution is allowed to cool to 25° C., still under agitation, and then allowed to settle for 30 minutes. The precipitate is filtered with filter paper, the solution evaporated in nitrogen flow, and the residue dried under vacuum at 80° C. until constant weight is reached. Thus one calculates the percent by weight of polymer soluble (Xylene Solubles—XS) and insoluble at room temperature (25° C.).

The percent by weight of polymer insoluble in xylene at ambient temperature is considered the isotactic index of the polymer. This value corresponds substantially to the isotactic index determined by extraction with boiling n-heptane, which by definition constitutes the isotactic index of polypropylene.

Materials used in the Examples

A polyolefin composition comprising components A) and B), hereinafter identified as "composition (A+B)", prepared by analogy with the examples of WO2007042375, is used to prepare a cross-linked polyolefin composition according to the present invention.

Such composition (A+B) has a MFR of 0.6 g/10 min. and is made of (percentages by weight):
A) 30% of a copolymer of propylene with ethylene, containing 2.5% of ethylene and having MFR of 35 g/10 min. and a content of fraction soluble in xylene at room temperature of 5%;

B) 70% of a copolymer of ethylene with propylene, containing 58% of ethylene.

The content of xylene-soluble fraction of composition (A+B) is of 56% by weight, and the intrinsic viscosity of such fraction is of 4 dl/g. Thus the content of xylene-soluble fraction of component B) is of 78% by weight, with an intrinsic viscosity of 4.1 dl/g.

Component C)

i) Ethylene copolymer containing 30% by weight of butene-1, sold by Mitsui Chemicals with the trademark Tafmer A-1050S.

Such copolymer has the following properties:
Shore A: 57;
Density: 0.86 g/cm$^3$;
MFR: 1.2 g/10 min. (190° C./2.16 kg)–2 g/10 min. (230° C./2.16 kg);

ii) Propylene copolymer containing 35% by weight of ethylene, sold by Mitsui
Chemicals with the trademark Tafmer S-4030.
Such copolymer has the following properties:
Shore A: 42;
Density: 0.86 g/cm$^3$;
MFR: 0.2 g/10 min. (190° C./2.16 kg)–0.4 g/10 min. (230° C./2.16 kg);

Cross-Linking Additive

Peroxide: Perhexa 25B®, consisting of 2,5-dimethyl-2,5-di(t-butylperoxy)hexane (CAS No. 78-63-7) sold by NOF CORPORATION;

Co-agent: DVB-570®, consisting of 61-65% of divinylbenzene (CAS No. 1321-74-0), 35-39% of ethylvinylbenzene (CAS No. 28106-30-1) sold by Nippon Steel Chemical Co., ltd

EXAMPLES 1 AND COMPARATIVE 1 AND 2

Cross-linking is carried out dynamically operating in a twin-screw extruder with a screw length/diameter ratio of 30. The polymer components and the cross-linking additive indicated in Table 1 are fed in the first blending zone. Connected to this blending zone is an area where the gas deriving from the decomposition of the peroxide are measured. Cross-linking is carried out through two consecutive blending zones.

The blending times and temperatures used in the cross-linking process of the examples range respectively from 45 to 120 seconds and from 140° C. to 220° C.

In addition to the said components, a conventional stabilizing package is added in the mixer to prevent thermal degradation and oxidation of the polyolefin composition.

TABLE 1

| Example No. | Comparative 1 | Comparative 2 | 1 |
|---|---|---|---|
| Composition (I) | | | |
| (A + B) wt % | 100% | 70% | 70% |
| A) % | 30 | 21 | 21 |
| B) % | 70 | 49 | 49 |
| C) % | 0 | 30 | 30 |
| i) wt %*[1] | 0 | 100 | 50 |
| ii) wt % *[1] | 0 | 0 | 50 |
| Cross-linking additive | | | |
| Peroxide, pph*[2] | 0.8 | 0.5 | 1 |
| Co-agent, pph*[2] | 1 | 1 | 0.7 |
| MFR (g/10 min.) | 0.02 | 0.02 | 0.03 |
| Strand surface quality | good | Melt fracture | good |
| Shore A*[3] | 88/84/83 | 77/72/70 | 80/75/74 |

TABLE 1-continued

| Example No. | Comparative 1 | Comparative 2 | 1 |
|---|---|---|---|
| Compression set at 75° C. | 56 | 55 | 52 |

*[1]Referred to the weight of i) + ii).
*[2]Parts by weight per 100 parts of composition (I).
*[3]Values measured after 0, 10, 30 seconds respectively.

The invention claimed is:

1. A polyolefin composition comprising, all percentages being by weight:
   A) from 5 to 38% of a polypropylene component comprising a propylene homopolymer or a propylene copolymer with at least one α-olefin comonomer or combinations thereof, said polypropylene component containing at least 85% of propylene and having a solubility in xylene at room temperature lower than 20%;
   B) from 35 to 85% of a copolymer of ethylene with propylene, containing from 42 to 70% of ethylene and having solubility in xylene at room temperature greater than 50%;
   C) from 5 to 45% of a polymer composition comprising a blend of:
      i) from 20 to 80% of an ethylene copolymer having a Shore A hardness value equal to or lower than 90 points and containing up to 45% of at least one α-olefin comonomer, provided that, when propylene is present as comonomer, such copolymer i) has a composition which is different from B);
      ii) from 20 to 80% of a copolymer comprising 60 to 80%, based upon the total weight of the copolymer, of propylene derived units and 20 to 40%, based upon the total weight of the copolymer, of at least one α-olefin, wherein the copolymer has a Shore A hardness value equal to or lower than 90 points;
   wherein the amounts of A), B) and C) are referred to the total weight of A)+B)+C) and the amounts of i) and ii) are referred to the weight of C).

2. The polyolefin composition of claim 1, wherein the intrinsic viscosity [η] of the fraction soluble in xylene at room temperature of component B) of the polyolefin composition (I) is at least 3 dl/g.

3. The polyolefin composition of claim 1, wherein the polyolefin composition is cross-linked.

4. The polyolefin composition of claim 3, obtained by blending the polyolefin composition with a cross-linking additive to produce a blend, and heating the blend at a temperature above the melting temperature of component A) to form the cross-linked polyolefin composition.

5. The polyolefin composition of claim 4, wherein the cross-linking additive comprises a free radical initiator and a cross-linking co-agent.

6. The polyolefin composition of claim 5, wherein the free radical initiator is an organic peroxide and the cross-linking co-agent is selected from the group consisting of divinylbenzene, ethylvinylbenzene, triallyl cyanurate, tryallyl isocyanurate, 1,2-polybutadiene, acrylates, methacrylates and furan derivatives.

7. The polyolefin composition of claim 4, wherein the blend is heated to a temperature from 160 to 250° C.

8. A manufactured article comprising:
   a polyolefin composition comprising, all percentages being by weight:
      A) from 5 to 38% of a polypropylene component comprising a propylene homopolymer or a propylene copolymer with at least one α-olefin comonomer or combinations thereof, said polypropylene component containing at least 85% of propylene and having a solubility in xylene at room temperature lower than 20%;

B) from 35 to 85% of a copolymer of ethylene with propylene, containing from 42 to 70% of ethylene and having solubility in xylene at room temperature greater than 50%;

C) from 5 to 45% of a polymer composition comprising a blend of:
  i) from 20 to 80% of an ethylene copolymer having a Shore A hardness value equal to or lower than 90 points and containing up to 45% of at least one α-olefin comonomer, provided that, when propylene is present as comonomer, such copolymer i) has a composition which is different from B);
  ii) from 20 to 80% of a copolymer comprising 60 to 80%, based upon the total weight of the copolymer, of propylene derived units and 20 to 40%, based upon the total weight of the copolymer, of at least one α-olefin, wherein the copolymer has a Shore A hardness value equal to or lower than 90 points;
  wherein the amounts of A), B) and C) are referred to the total weight of A)+B)+C) and the amounts of i) and ii) are referred to the weight of C); and wherein the article is a wire and cable sheath, auto interior skins, synthetic leather, or extruded profiles.

\* \* \* \* \*